(No Model.)  F. H. RICHARDS.  11 Sheets—Sheet 1.
WEIGHING MACHINE.

No. 574,168.  Patented Dec. 29, 1896.

Witnesses:

Inventor:
F. H. Richards.

(No Model.)  F. H. RICHARDS.  11 Sheets—Sheet 2.
WEIGHING MACHINE.

No. 574,168.  Patented Dec. 29, 1896.

Witnesses:  Inventor:

(No Model.)  11 Sheets—Sheet 3.

F. H. RICHARDS.
WEIGHING MACHINE.

No. 574,168.  Patented Dec. 29, 1896.

Witnesses:
Chas. F. Schmelz
J. L. Edwards Jr.

Inventor:
F. H. Richards (No Model.) 11 Sheets—Sheet 4.

F. H. RICHARDS.
WEIGHING MACHINE.

No. 574,168. Patented Dec. 29, 1896.

Witnesses:

Inventor:

(No Model.)

11 Sheets—Sheet 5.

F. H. RICHARDS.
WEIGHING MACHINE.

No. 574,168.

Patented Dec. 29, 1896.

Witnesses:

Inventor:

(No Model.)  
11 Sheets—Sheet 6.

F. H. RICHARDS.
WEIGHING MACHINE.

No. 574,168.  Patented Dec. 29, 1896.

Witnesses:  
Chas. F. Schmelz  
F. L. Edwards Jr.

Inventor:  
F. H. Richards (No Model.)

F. H. RICHARDS.
WEIGHING MACHINE.

No. 574,168.   Patented Dec. 29, 1896.

11 Sheets—Sheet 7.

Witnesses:
Chas. F. Schmelz
G. L. Edwards Jr.

Inventor:
F. H. Richards (No Model.)  F. H. RICHARDS.  11 Sheets—Sheet 8.
WEIGHING MACHINE.
No. 574,168.  Patented Dec. 29, 1896.
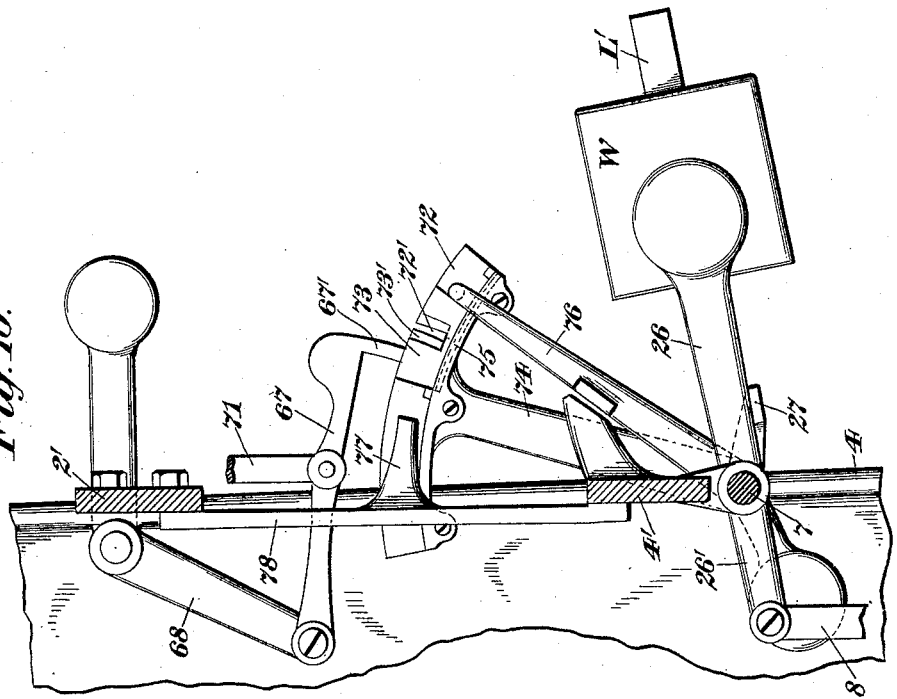
Witnesses:
Inventor:
F. H. Richards (No Model.) 11 Sheets—Sheet 9.

F. H. RICHARDS.
WEIGHING MACHINE.

No. 574,168. Patented Dec. 29, 1896.

Witnesses:

Inventor:
F H Richards (No Model.)　　　　　　F. H. RICHARDS.　　　11 Sheets—Sheet 10.
WEIGHING MACHINE.
No. 574,168.　　　　　　　　　Patented Dec. 29, 1896.
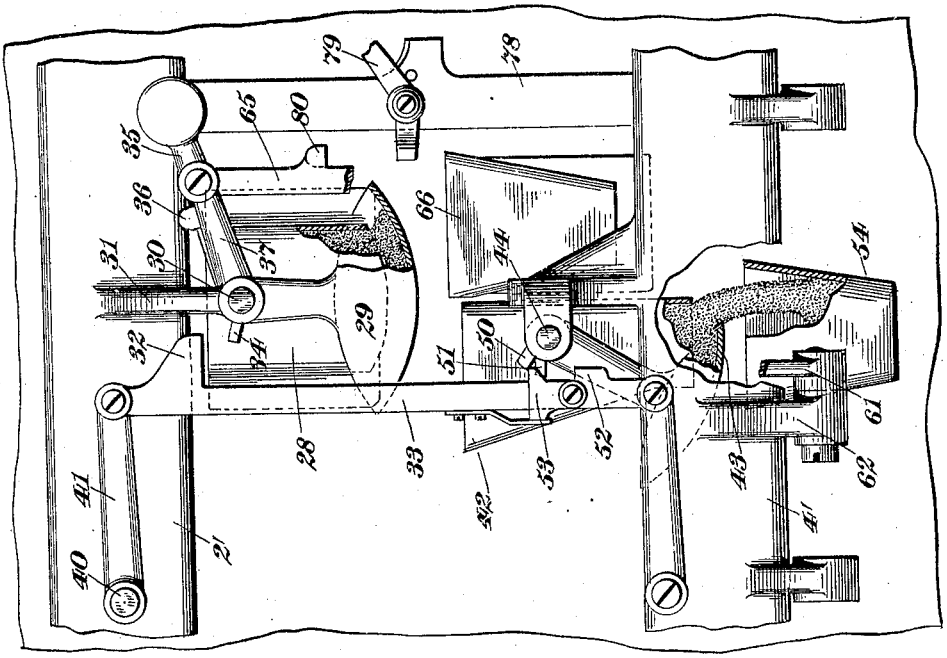
Witnesses:　　　　　　　　　　　　Inventor:

(No Model.) 11 Sheets—Sheet 11.
F. H. RICHARDS
WEIGHING MACHINE.
No. 574,168. Patented Dec. 29, 1896.
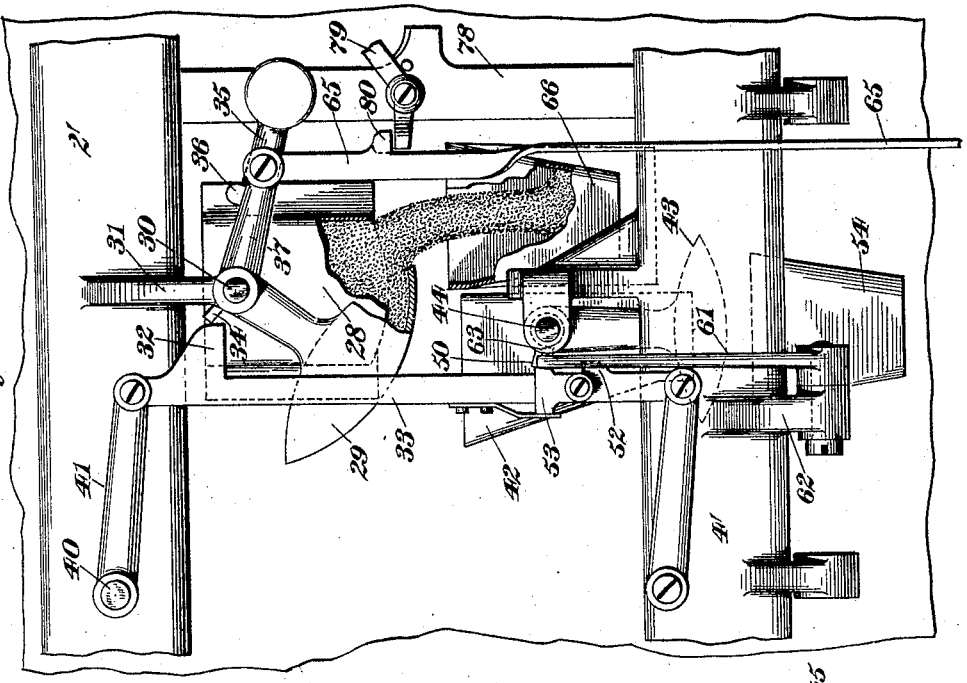
Witnesses:
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 574,168, dated December 29, 1896.

Application filed August 15, 1896. Serial No. 602,865. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, an object being to provide an improved machine of this character more especially intended for automatically weighing granular and pulverulent materials and fluids in relatively large quantities or lots in a minimum space of time and with facility and precision equal to hand-weighing, the machine being particularly advantageous for use in the transference of grain, coal, &c., from car to car, it being adapted to weigh a whole car-load in a single operation.

Figure 1:
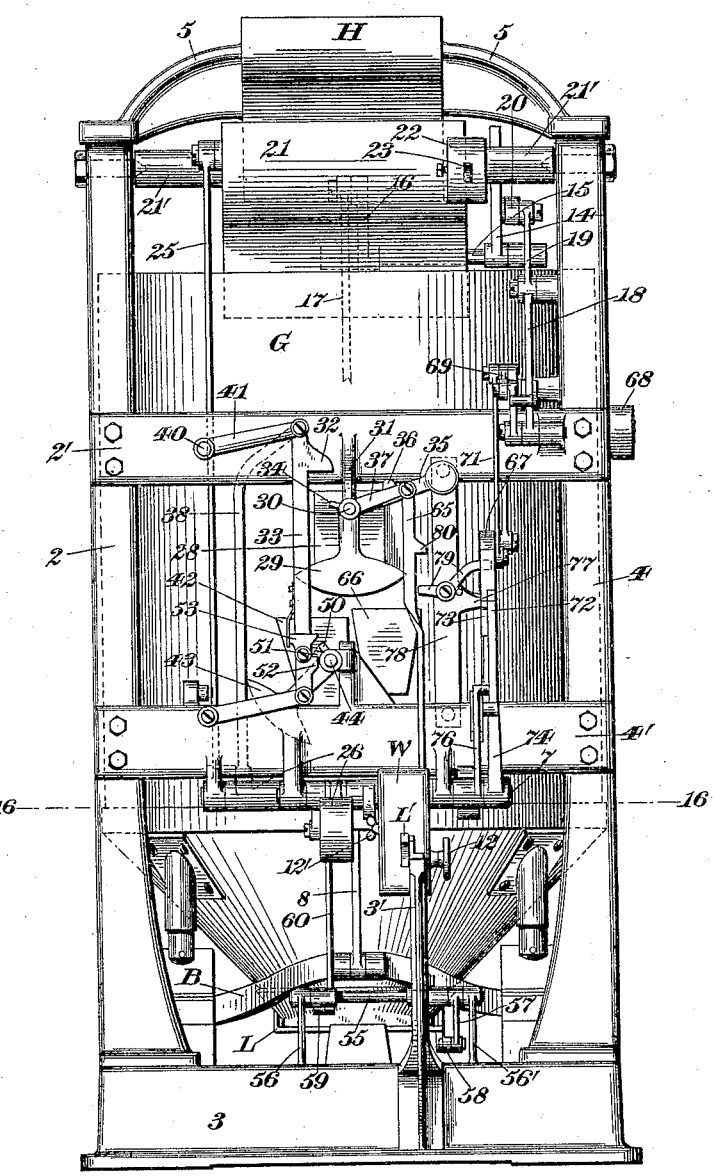
Figure 2:
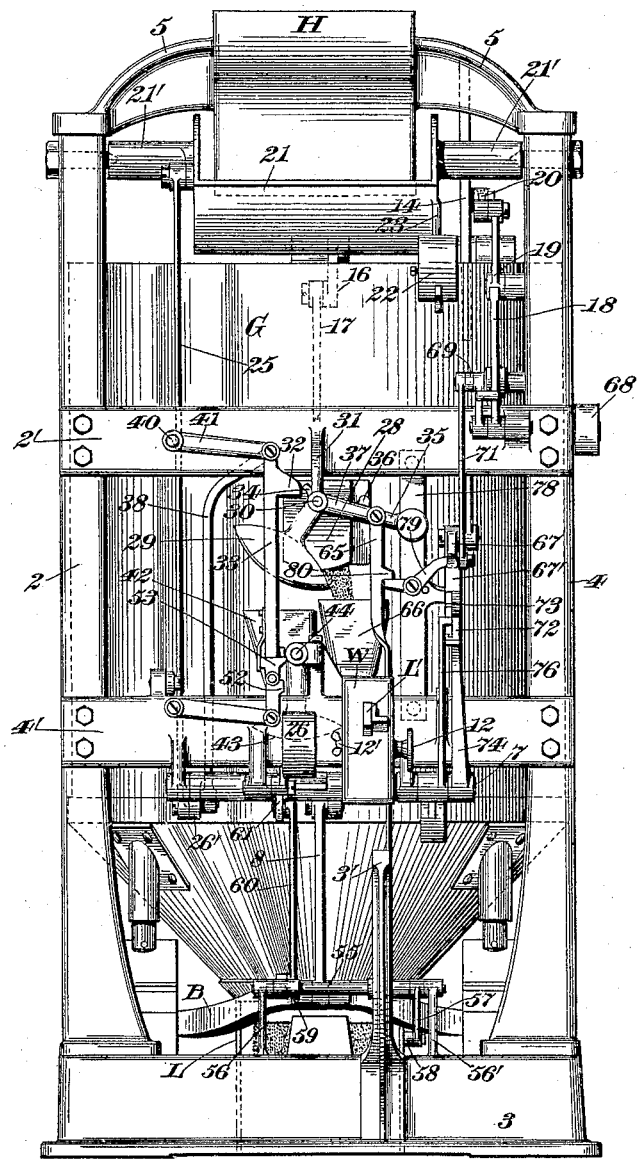
Figure 3:
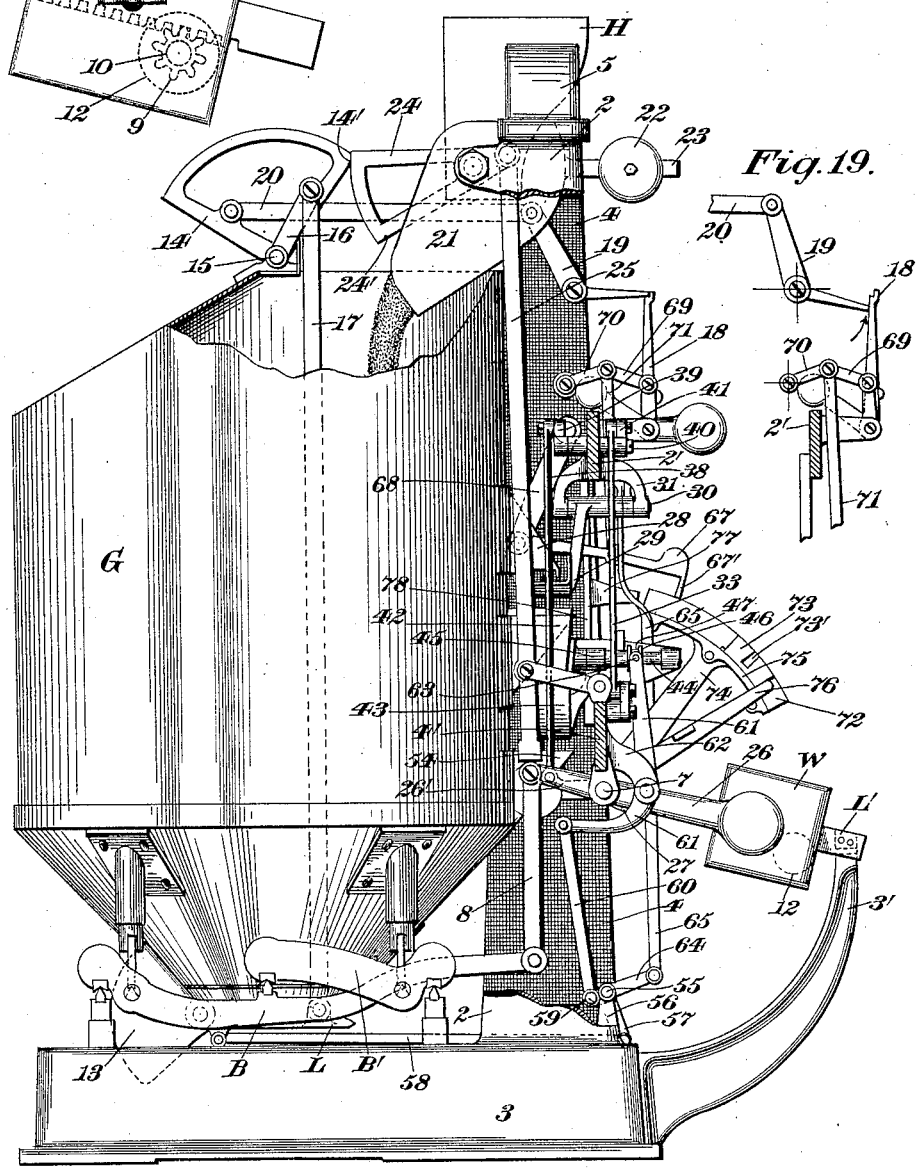
Figure 19:
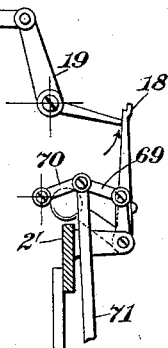
Figure 4:
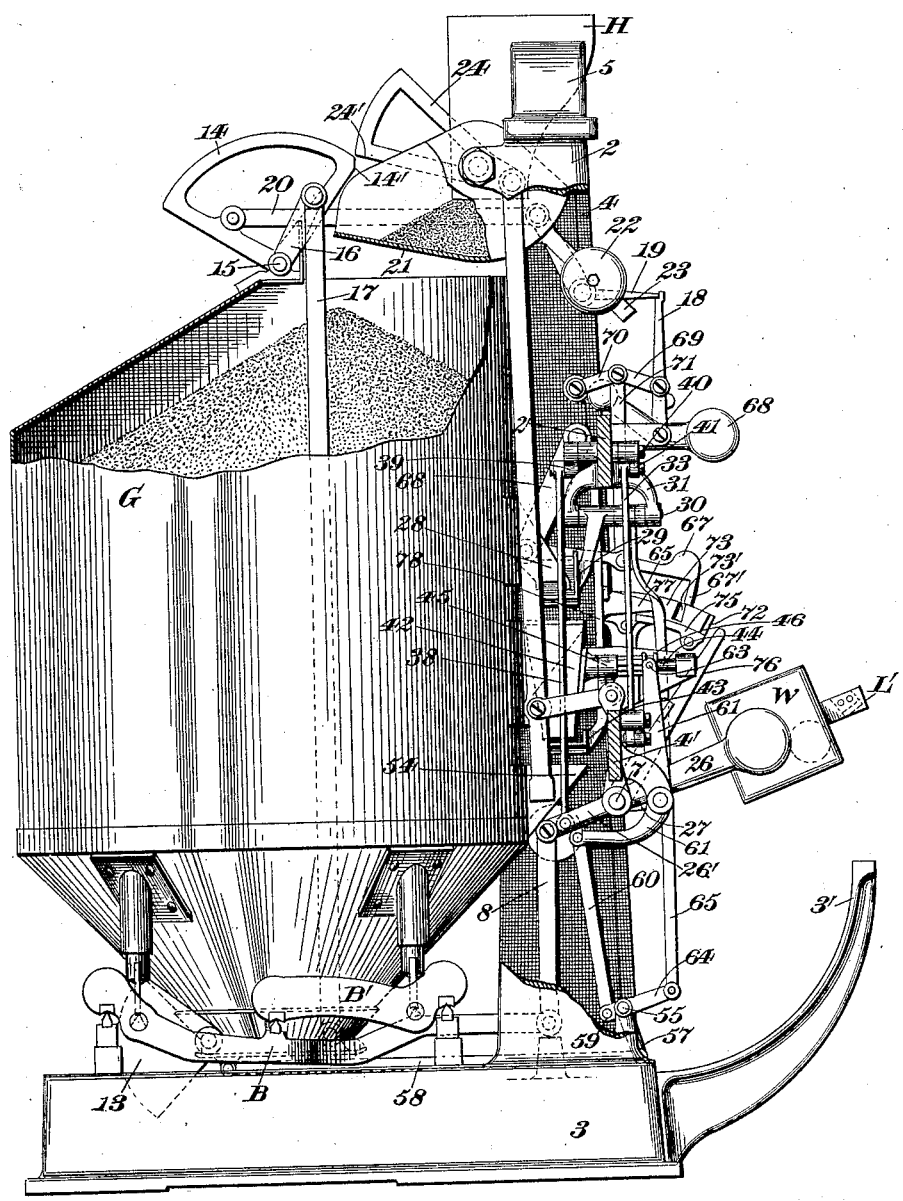
Figure 5:
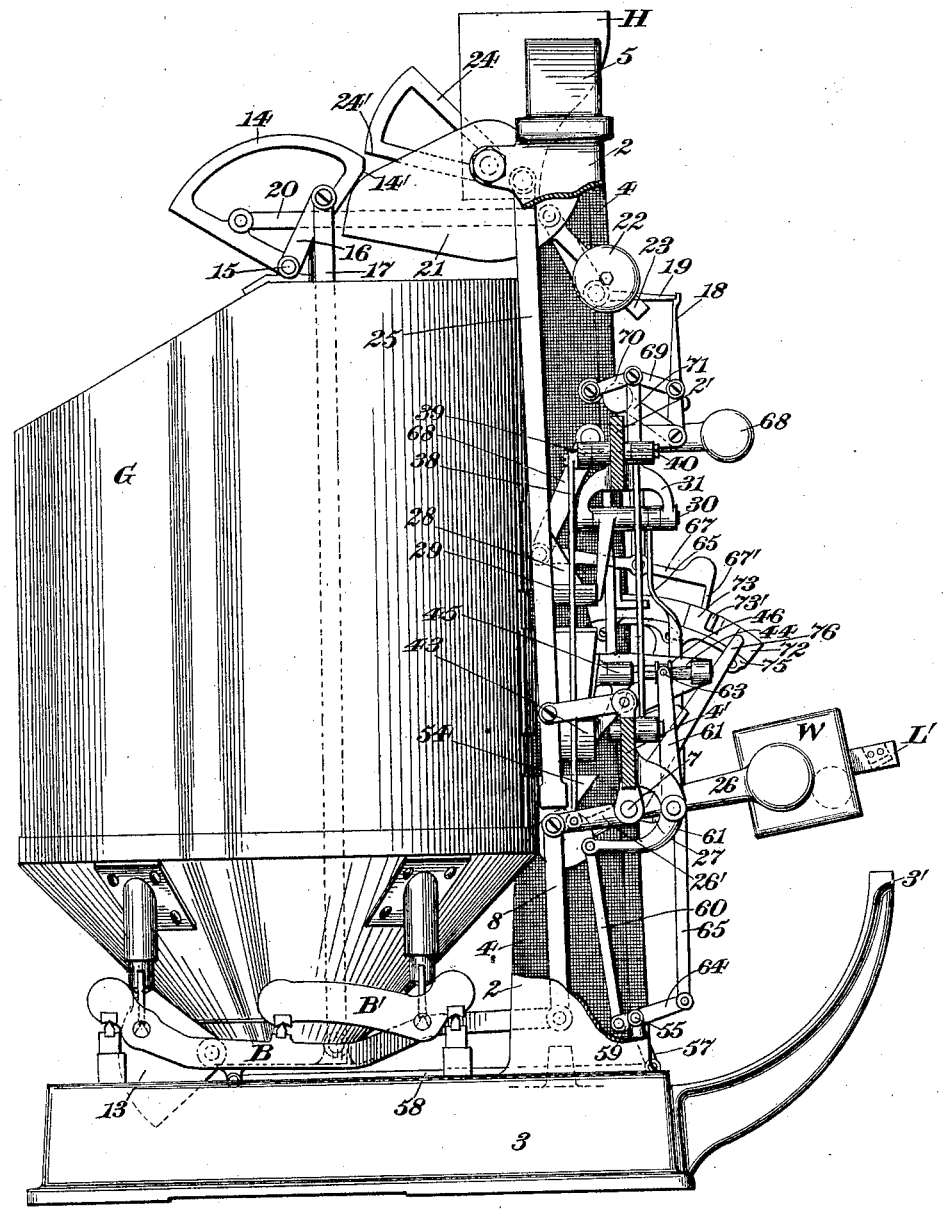
Figure 6:
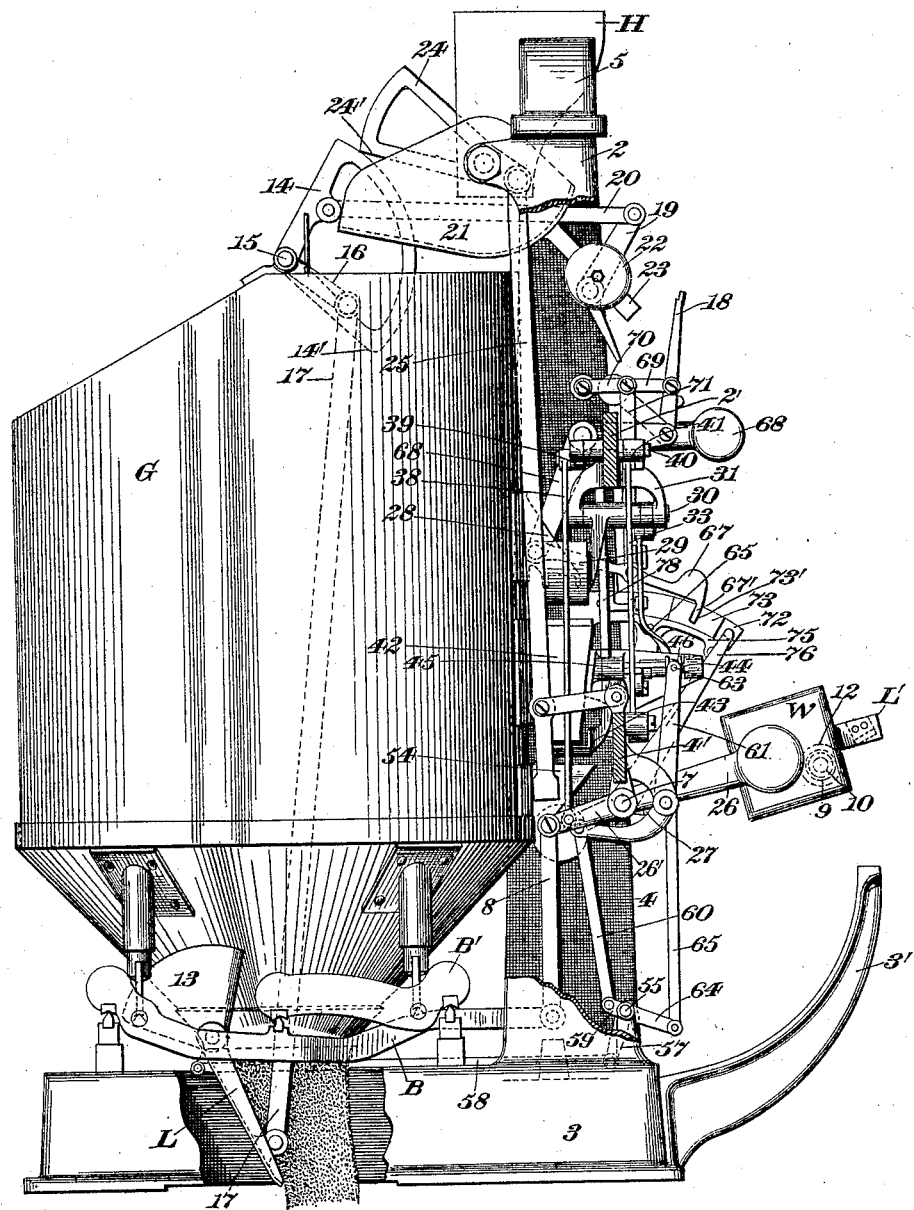
Figure 8:
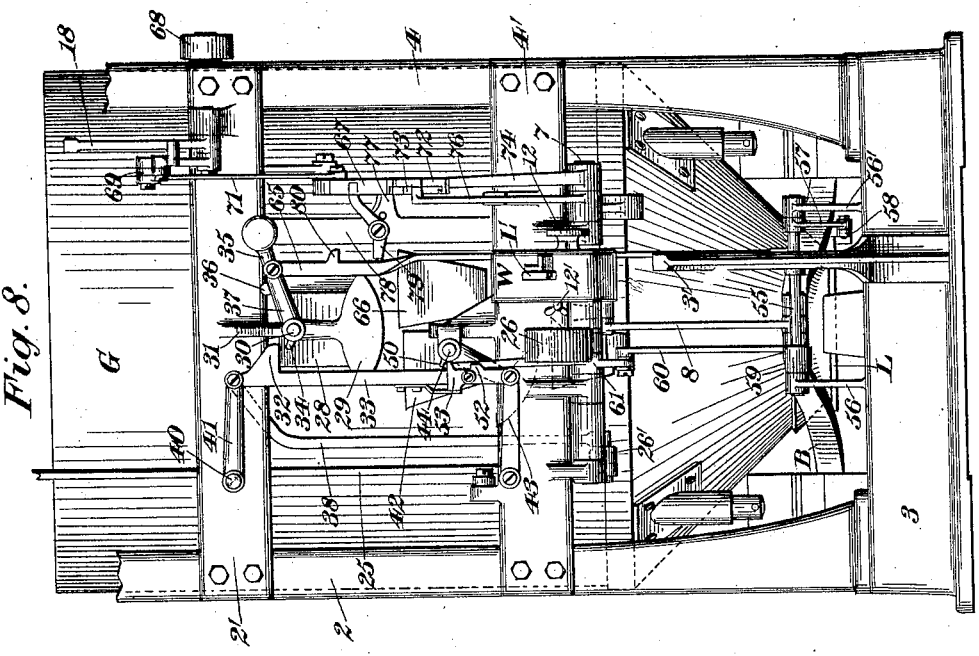
Figure 7:
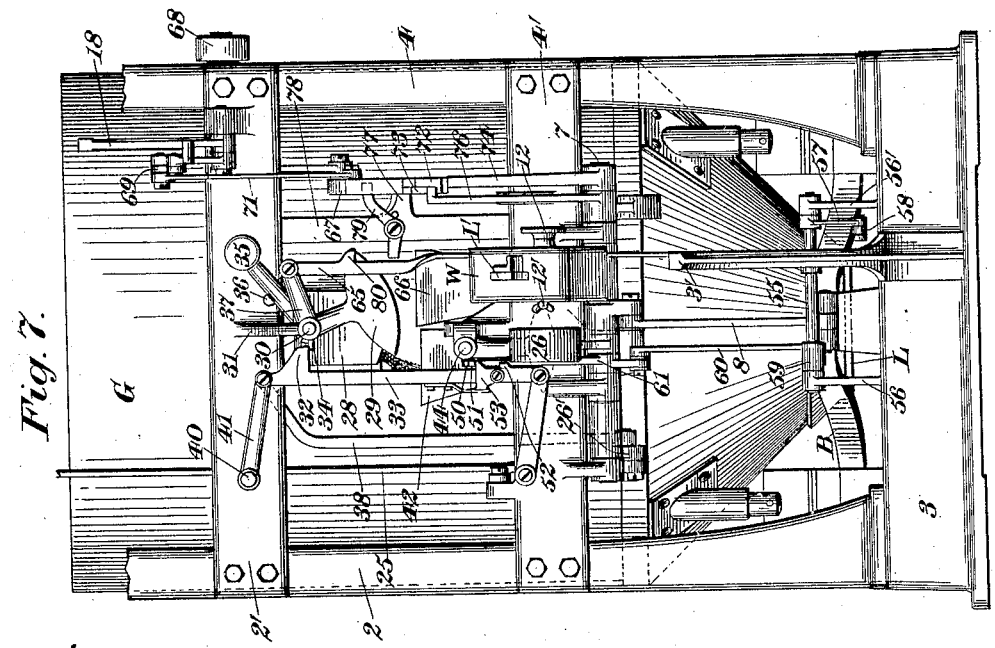
Figure 12:
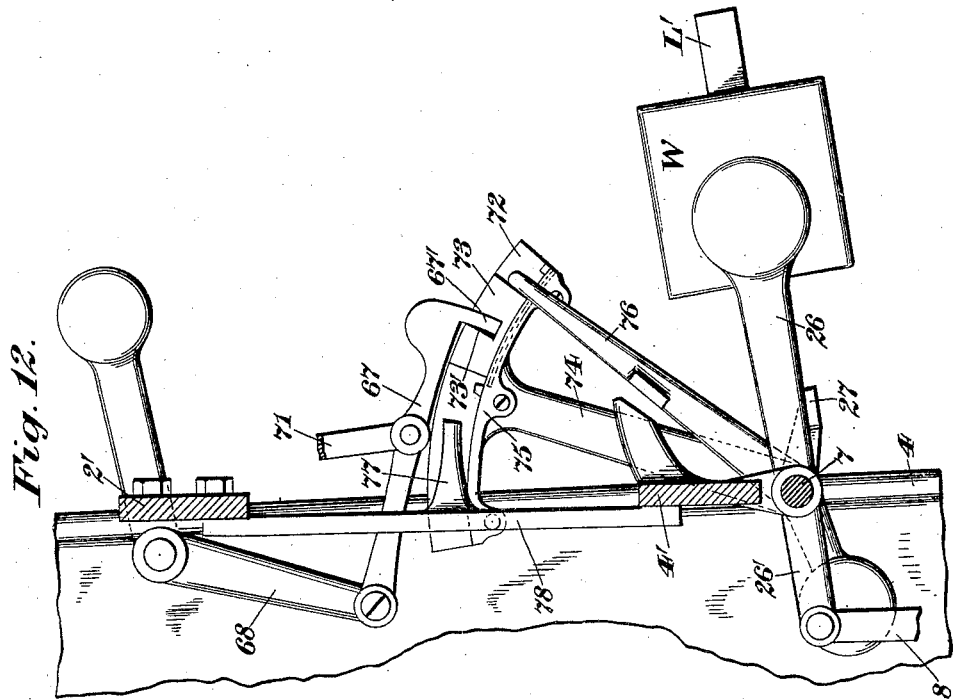
Figure 11:
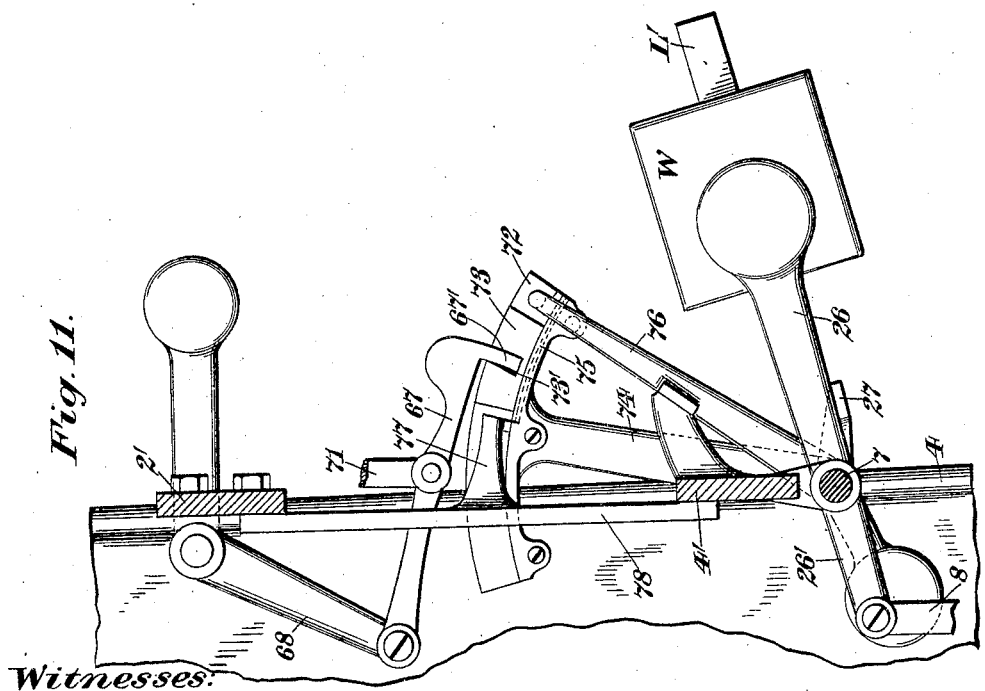

In the drawings accompanying and forming part of this specification, Figure 1 is a rear elevation of a weighing-machine comprehending my present improvements in an embodiment thereof, the respective parts being shown in the positions they occupy at the commencement of operation. Fig. 2 is a similar view illustrating the positions assumed by said parts during the load-discharge period. Fig. 3 is an end elevation as seen from the left in Fig. 1, the operative parts being shown in positions corresponding with said Fig. 1. Figs. 4 and 5 are similar views showing the load-receiver as overloaded and underloaded, respectively. Fig. 6 is a similar view showing the load-receiver discharging its contents. Figs. 7 and 8 are views of the load-receiver and adjacent parts in positions corresponding, respectively, with Figs. 4 and 5. Figs. 9, 10, 11, and 12 are detail views, on an enlarged scale, of the load-discharge mechanism in four successive positions occupied thereby during the weighing and discharging of a load. Figs. 13, 14, and 15 are detail views, on an enlarged scale, of the load-supply mechanism in three successive positions. Fig. 16 is a sectional view, the section being taken in the line 16 16, Fig. 1; and Figs. 17, 17ª, 18, 18ª, 19, and 20 are detail views hereinafter more particularly described.

Similar characters designate like parts in all the figures of the drawings.

My present invention is in the nature of an improvement upon that set forth by my concurrently-pending application, Serial No. 598,555, filed July 9, 1896, and embodies, in connection with a suitable load-receiver, overloading, load-reducing, and auxiliary load-supply mechanisms, preferably automatically operative in the order named—that is to say, the load-receiver will be of a given capacity, means being employed for overloading the same, then reducing or underloading by removing a portion of the mass within said load-receiver, and subsequently adding to its contents, these operations succeeding each other or alternating during the weighing of a load.

The framework for supporting the operative parts of the machine may be of any suitable character, and it is herein illustrated constituting the frames or columns 2 and 4, mounted upon the chambered supporting-base 3 and surmounted by the top plate 5, with which latter may be integrally formed the chute or hopper H, which constitutes a suitable medium for overloading the load-receiver.

The end frames 2 and 4 are connected by the transverse plates 2' and 4', constituting a part of the framework, and by which the stability of the latter is increased.

The load-receiver, which in the present instance is a bucket of the "single-chambered" type, is designated by G, and for supporting and balancing the same I prefer to employ the improved beam mechanism illustrated, which comprehends a main beam B, a pair of supplemental beams B' and B'', and a weight-carrying beam L', the latter being preferably operatively connected with said main beam.

The main and supplemental beams in the form shown each comprises a pair of longitudinal sections joined at points adjacent to its ends, thereby providing a strong and rigid structure and one also possessing comparative lightness and to which may be applied relatively wide bearings or supports for the bucket and beams, so that side movement or swaying of such members during the weighing operation will be prevented.

The main and supplemental beams B' and B'' will preferably be fulcrumed on the base 3, as is customary, the two supplemental beams also bearing on the main beam at points intermediate the extremities of the latter, said beams being also furnished with the ordinary pivots or knife-edges for sustaining the usual V-bearings depending from the bucket G.

For supporting the load or weight carrying beam L' a transverse rock-shaft 7 is illustrated, said shaft being journaled in bearings formed in brackets on the transverse plate 4', the hub of said beam L' being rigidly attached to said shaft. The inner end of the beam L' is connected to the main beam B by the interposed link 8, said link being pivoted between the two parts of said main beam. The beam L', in practice, will be provided with suitable graduations and carries the sliding weight W, by which a load or charge of predetermined quantity, or fractional parts thereof, may be weighed out.

Figure 20:
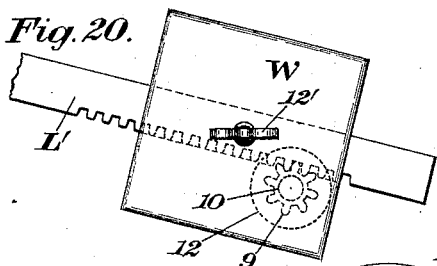

The beam L' is in the nature of a rack, (see Fig. 20,) its lower face being toothed, with which is adapted to mesh a pinion 9, mounted on the transverse shaft 10, rotatively supported by said weight, said shaft being provided with the thumb-piece 12, by which it, and hence the pinion 9, may be rotated, so that said weight may be readily reciprocated back and forth along the supporting-beam L' when desired, a thumb-screw 12' being provided to firmly hold said weight in an adjusted position.

The main portion of the bucket G will be cylindrical in cross-section, being partially covered at the top to prevent scattering of the material, and at a point near its lower edge will slope toward the discharge-outlet, whereby the contents of the bucket may be discharged with rapidity.

For controlling the discharge-outlet of the bucket a closer L is employed, it consisting in the present instance of an approximately flat plate pivotally supported at one side of the discharge-outlet and being furnished with a counterweight 13 of proper closer-shutting efficiency.

For maintaining the closer shut during the weighing operation the following-described holding or restraining means may be employed: A rocker is shown at 14 pivotally mounted on the bucket G, it being fast on the rock-shaft 15, which is journaled in a bearing on the bucket. The shaft 15 also has rigidly connected thereto the crank-arm 16, to which is jointed the vertically-disposed connecting-rod 17, said rod being pivoted between ears or lugs formed on the upper face of the closer L.

It will be seen by reference to the drawings, and more especially to Fig. 16, that the closer-supporting rod 17 passes through the bucket and is connected to the closer at a point about its middle, so that sagging thereof—the tendency to which in a machine of large capacity is exceedingly marked—is prevented, said closer being also held tightly against its seat on the bucket, by reason of which accidental escape of material from the bucket during the process of weighing is guarded against.

It will be evident that by arresting or limiting the movement of the rocker 14 the closer L will be held against opening or discharge movement; and for this purpose I have illustrated a counterweighted latch or detent 18 in the form of an angle-lever pivoted to a bracket on the transverse plate 2', the upright arm of said latch being shouldered and normally engaging the free arm of the angle-lever 19, which is pivotally supported by the end frame 4, the other arm of said angle-lever being operatively connected to the rocker 14 by the rod 20.

It will be remembered that the invention contemplates the provision of overloading, load-reducing, and auxiliary load-supply means, preferably operative in the order named, the chute H constituting a convenient device for overloading the load-receiver.

For controlling the stream of material which issues from the supply opening or outlet of the chute H the valve 21 may be used, such overload-controlling valve being of the kind disclosed by Letters Patent No. 535,727, granted to me March 12, 1895, and being oscillatory below the mouth of the chute H, the two-part shaft 21' of said valve being hung between suitable arms on the end frames 2 and 4.

For effecting the closure of the valve 21 and consequent cut-off of the supply-stream from the chute H, I have illustrated a counterweight 22 on the arm 23, which projects rearward from the valve, and said counterweight may be adjustable along said arm to adapt the valve to varying conditions, said counterweight normally tending to shut the valve. This operation, however, will be properly checked during the flow of the supply-stream into the bucket, as will hereinafter appear.

I have illustrated herein reciprocally-effective interlocking mechanism, the same consisting of a pair of stops, one of which, or that operative with the closer L, is the rocker 14, the coacting or valve-operative stop member being designated by 24 and depending from and rigid with the two-part shaft 21', such parts being preferably in the form of skeleton segments. The function of said members is to prevent the release of the closer L should the latch 18 be prematurely tripped, and for also preventing the opening of the valve while the load is being discharged. The action of these members is illustrated in Figs. 3, 4, 5, and 6, the valve 21 being wide open in the first-mentioned figure and the closer being open in the last-mentioned figure.

While the valve is open, as shown in Figs. 3, 4, and 5, the straight stop-face 14' will be contiguous to the curved face of the segment 24, so that should the latch 18 be prematurely tripped the oscillation of the stop member 14, and hence the opening of the closer L, will be positively blocked.

When the valve 21 has reached its cut-off position, the stop member 24 will have intersected the plane of curvature of the rocker or stop member 14, so that, the latch 18 being tripped, said rocker, and hence the closer L, are free to oscillate, the latter being instantly forced open by the weight of the contents in the bucket.

On the oscillation of the rocker or stop 14 its curved face will ride approximately in contact with the straight face 24' of the stop 24, so that retractive movement of the latter, and hence the opening of the valve, is blocked.

For opening the valve 21 the following mechanism may conveniently be employed: A depending thrust-rod is shown at 25 pivoted to an extension on the valve-shaft 21' and having its free end positioned to receive the thrust from the valve-opening actuator, which is transferred to the valve for forcing the same open, such mechanism being in some respects similar to that disclosed by my prior patent, No. 548,840, granted October 29, 1895, to which reference may be had.

The valve-opening actuator consists of a counterweighted lever 26, its hub being sleeved to the shaft for oscillatory movement, the weighted arm of said lever normally impinging against a projection 27 on the hub of the weighted beam L', so that said members, or the poising sides thereof, may have a descending movement in unison.

It is to be understood that when descending movement of the beam L', or the lever 26, which is also in the nature of a beam, is referred to the "poising side," or that part of said members to the left of the axis of movement thereof, is meant.

During a certain period in the operation of the machine, as indicated in Fig. 3, and until the valve 21 has reached its cut-off position, the rod 25 will bear against the inner end of the lever 26, so that the closure of the valve by the counterweight 22 may be checked or retarded in correspondence with the descending movement of the beam L' and the lever 26, which move in synchronism.

When the overloaded bucket passes below the poising-line, as indicated in Figs. 4, 5, and 6, the lever 26 will move away from the rod 25. On the opening of the closer L, and when a certain proportion of the load has been discharged from the bucket G, the beam mechanism, overcoming the lightened bucket, will cause the latter to rise, the lever 26 moving upward therewith until it meets the depending thrust-rod 25, which intercepts its further movement, as the valve 21, and also such rod 25, are firmly blocked, the beam L' continuing its movement until the counterweighted or counterpoised side thereof reaches the stop 3'.

When the bucket is emptied, the closer L will be shut, such action releasing the valve 21, and also the lever 26, so that said lever will drop to its normal position against the projection 27, substantially in the manner referred to in the patent last mentioned herein, and in so doing will effect the opening of the overload-controlling valve.

The bucket G will be overloaded by a stream of material flowing from the chute or hopper, which will cause its descent to a point below the poising-line, the next step in the operation being to underload or reduce the mass within the bucket to a quantity less than that determined upon for the true load or charge, and for this purpose an opening will be formed in the bucket, such opening in the present instance being the delivery-mouth of the spout 28 on the bucket G, and which communicates with the interior thereof, the load-reducing spout being preferably inclined, so that material may flow freely therefrom.

For controlling the outlet or opening in the spout 28 a valve 29 may be employed, that shown herein being in the nature of a two-way valve and being rigidly mounted on the rock-shaft 30, which is journaled in the arms of the bifurcated bracket 31, depending from the transverse plate 2'.

For swinging the valve 29 open to permit a part of the material to flow from the overloaded bucket G through the load-reducing spout 28, whereby the bucket contents may be reduced, I prefer to employ an actuator operative with the beam mechanism, such actuator being shown as the projection 32, formed on the reciprocatory rod 33 and having a descending movement into engagement with the boss or stud 34, which projects from the hub of the valve 29, so that on the continuation of such movement, as indicated clearly in Fig. 13, a portion of the material within the spout 28 may gravitate or pour therefrom. On the ascending stroke of the rod 33 the actuator 32, moving away from the boss 34, will permit the closure of the load-reducing valve 29 and necessarily the cut-off of the stream from the load-reducing spout 28. For thus actuating the valve 29 to close the same the hub of the valve will be furnished with a laterally-projecting counterweighted arm 35, said arm having a stud 36, which bears against the rock-arm 37, the latter during the normal period of the operation of the machine being held against movement and constituting, in effect, a fixed abutment and limiting the stream-cut-off movement of the valve 29, as indicated in Figs. 1, 8, and 14.

The hub of the lever 26 is furnished with the projection 26', to which is pivoted the vertically-disposed rod or bar 38, which has jointed to its upper end the link 39, which is firmly attached to the shaft 40, mounted on the transverse plate 2', said shaft having at its outer end the link 41, which is pivoted to the vertically-disposed actuating bar or rod 33.

The action of the overloading and load-reducing mechanisms will be obvious from an inspection of Figs. 3, 4, 7, and 14. The bucket G will be overloaded by a stream of material from the chute or hopper H, which is delivered thereinto by the valve 21, so that said bucket will descend to a point below the poising-line, the beam mechanism, including the beam L' and the counterweighted lever, descending in synchronism therewith, and as said lever falls away from the connecting-rod 25 the result will be a closure of the valve 21 and the cut-off of the supply-stream. When the bucket passes below the poising-line, the counterweighted lever 26, as will be understood, descends, so that the actuating bar or rod 33, through its operative connections therewith, is drawn downward until the actuator 32 meets the boss 34 on the valve-supporting shaft 30, and on the continuation of such movement the load-reducing valve will be forced open, as indicated in Figs. 7 and 13, to thereby permit a certain quantity of material to flow from the bucket through the spout 28. As the bucket is lightened it and the beam mechanism will rise, and, the projection or actuator 32 ascending simultaneously therewith and moving away from the boss 34, the valve 29 will be shut by the counterweighted arm 35, the movement of said valve being arrested when the boss on said arm 35 reaches the link 37, as indicated in Fig. 8.

For receiving the surplus which is removed from the bucket I have illustrated a chute 42, supported independently of the weighing mechanism, it being herein shown carried by the framing of the machine, such chute being in the nature of an auxiliary load-supply device or surplus-receiver, its discharge-outlet being preferably controlled by a valve which covers and uncovers the same, the inlet-opening of said chute being controlled by the load-reducing valve 29, said valve delivering the material from the load-reducing spout into said chute 42, the latter acting as a storage-box for temporarily retaining the mass. The chute 42 will be disposed under the spout 28.

The valve for the chute or auxiliary load-supply device 42 is designated by 43 and has a swinging movement below the outlet, the hub 45 of said valve being sleeved to the fixed support 44 and constituting the fixed member of a clutch, the complemental or sliding clutch member being designated by 46. (See Figs. 17, 17ª, 18, and 18ª.) The slidable clutch member 46 is peripherally grooved at 47 and is also furnished with a projecting key or lug 48, adapted to be thrust into the notch or keyway 49 of the valve-hub or clutch member 45, so that when said members are coupled and pressure is applied to the clutch member 46 the auxiliary load-supply valve 43 may be opened to permit the gravitation of part of the material from the auxiliary load-supply device 42, as indicated in Fig. 14. The clutch member 46 is provided with the projections 50 and 51, which when the two clutch members or sections are coupled will also be coupled to the valve and practically form a part thereof. The projections 50 and 51 are also disposed in the path of movement of a pair of actuators for the auxiliary load-supply valve 43, one of said actuators, or that which engages the projection 51, being designated by 52, and the other being designated by 53. The last-mentioned actuator is a by-pass actuator, it being in the nature of a spring-dog mounted on the reciprocating bar or rod 33, the companion actuator constituting an integral part of said rod.

An auxiliary load-receiver is shown at 54 in the form of a spout communicating with the interior of the bucket, its stream-directing face being inclined toward the discharge-outlet of the bucket, such auxiliary receiver receiving a part of the material from the chute 42, which is delivered thereinto by the auxiliary load-supply valve 43 as the latter opens, as indicated in Fig. 14.

As the bucket descends below the poising-line the valve 29 will be opened by the actuator 32, thereby permitting the surplus to flow from the spout 28 into the auxiliary load-supply device or chute 42. As the bucket lightens it will ascend and the rod 33 will be thrust upward by the action of the beam mechanism until the by-pass actuator 53 is carried against the projection 50, so that the auxiliary load-supply valve may be swung open and a portion of the material from the auxiliary supply device 42 flow into the auxiliary load-receiver 54, thereby again causing the descent of the bucket, and these operations will alternate until the true load is weighed, at which time the bucket will assume a stationary position on the poising-line, it being understood that the amounts taken from and restored to the bucket during the process of weighing will be proportional to the vertical strokes of the bucket.

On the completion of the bucket load or true charge it is important that the material within the auxiliary load-supply device should be prevented from escaping, as it forms no part of the true load, and for this purpose the valve 43 will be momentarily thrown out of action, or during the load-discharge period, and I prefer to employ means operative with the bucket-closer L for attaining this result.

A transverse rock-shaft is shown at 55 mounted on the posts 56 and 56', which rise from the base 3, said shaft being provided with the crank-arm 57, to the lower end of which is pivoted the rod 58, the opposite end of said rod being pivoted between lugs or ears on the under face of the closer L at a point adjacent its center of movement.

The shaft 55 is furnished with a second crank-arm 59, to which is pivoted the upright link 60, said link being also jointed to the curved arm of the lever 61, which is supported by the bracket 62 for oscillation, the other arm of said lever being furnished with a projecting pin 63, which enters the peripheral groove of the clutch member 46.

Let it be assumed that the latch 18 has been tripped and the closer L thereby released. Such action taking place, the closer L will be instantly forced open by the weight of the contents of the bucket, as indicated in Fig. 6, the rod 58 being instantly thrust to the left and the upright or straight arm of the lever 61 being swung to the right through the interposed connections, thereby moving the clutch member 46 in a corresponding direction and withdrawing the key 48 from the recess 49 in the valve-hub 45, so that as the actuator 53 rises with the lightened bucket and engages the projection 50 on the clutch-section 46 the latter will be simply rocked idly about its support without affecting the auxiliary load-supply valve 43, which is then in its closed position, as indicated in Fig. 15. On the shutting of the closer L the operation just described will be reversed, whereby the two clutch-sections 46 and 45 will be instantly coupled, and as the empty bucket rises to receive a new charge the actuator 52 will be moved into engagement with the projection 51 and will open the valve 43, so that the mass of material within the chute 42 will be delivered into the auxiliary load-receiver, from whence it passes into the empty bucket, forming the nucleus of the new charge to be made up therein.

It is essential that the material within the load-reducing spout 28 on the completion of the true load should be discharged therefrom, as it forms a part thereof.

The rock-shaft 55, to which allusion has been hereinbefore made, is furnished with a crank-arm 64, to which is pivoted the relatively long rod 65, said rod being connected at its upper end to the rock-arm 37. On the opening of the closer in the manner previously described the rod 65, by reason of its operative connections therewith, will be pulled downward, and the rock-arm 37, which is loose on the shaft 30, will be thereby caused to move away from the projecting stud 36 on the counterweighted valve-actuating arm 35, as illustrated in Fig. 15, so that the valve 29 may be opened by said arm 35 and the material within the spout 28 may be delivered by said valve into the spout 66, which communicates with the interior of the bucket, such material flowing from the spout into the bucket and passing through the discharge-opening of the latter with the weighed charge.

It will be understood that my present invention involves a load-discharge controller, and safety devices will be employed for blocking the action of said load-discharge controller as the bucket passes below and above the poising-line during the weighing of a load and until the bucket assumes a stationary position on the poising-line, at which point its load-discharge controller is immediately released and the measured charge will be discharged by the bucket. In my present invention the closer-latch 18, to which I have hereinbefore referred, constitutes such a load-discharge controller, the tripper for the same being designated by 67 and being in the form of a yieldingly-mounted counterweighted lever, which is self-active and is normally held against gravitation or downward movement by a suitable abutment. The said latch-tripper 67 is joined to the counterweighted angle-lever 68, the latter in turn being pivotally supported by the framing of the machine. The latch 18 is shown fixed to the member 69 of a toggle, the other member, 70, of said toggle being attached to the framing of the machine. Said toggle is shown connected at its knuckle to the latch-tripper 67 by the intervening link 71.

It will be assumed that the latch-tripper 67 has been released and that it drops as illustrated in Fig. 6, and on such movement the three pivots of the toggle members 69 and 70 will be thrown into line by such latch-tripper through the connecting-link 71, so that the upright arm of the latch 18 will be thrust outward and the shoulder thereof disengaged from the free arm of the angle-lever 19, whereby the rocker 14, and hence the closer L, will be freed.

For limiting the effective movement of the latch-tripper 67 during the weighing of a load and as the bucket oscillates below and above the poising-line, whereby the bucket-latch 18 will be maintained in its effective or closer-restraining position, I have illustrated a pair of reciprocatory recessed or notched plates or blocks, one of which has a sliding movement relatively to the other during the weighing operation, said recesses being caused to come into alinement or register on the completion of the true load, and at a point opposite the tooth 67' of the latch-tripper, so that said tooth may be thrust into said registered recesses and the latch 18 thereby tripped.

The two reciprocatory plates are designated by 72 and 73, the first-mentioned being rigid with and forming a transverse head for the post 74, the hub of which is fast to the beam-supporting shaft 7. The sliding plate will be movable in suitable ways formed in the detachable face-plate 75, which is held against displacement by screws passing therethrough and entering the plate 72, said face-plate being furnished with suitable bosses or protuberances to limit the movement of the sliding plate. The notches in the two plates are designated by 72' and 73', and the upper faces of said plates are formed on concentric arcs.

It will be understood that so long as the two notches are out of alinement and the tooth 67' of the latch-tripper 67 bears against faces of the plates 72 and 73 the effective movement of said latch-tripper will be thereby checked. When, however, the two notches register at a point opposite the tooth 67', the latter will be thrust into said registered recesses by the force of the counterweight of said latch-tripper and the latch 18 will be instantly tripped and the closer L freed of all restraint.

The operation of the reciprocatory plates 72 and 73 is clearly illustrated in Figs. 9, 10, 11, and 12. The bucket G being overloaded by a stream of material from the chute H, it is caused to descend to a point below the poising-line, the beam mechanism moving in correspondence therewith, the beam-supporting shaft 7, of course, being rocked, so that the post 74 will be swung and the rigid plate 72 on said post will move through a relatively wide arc to the left, the recess 72' of said plate being carried past the plane of the tooth 67'. The recess 73' of the plate 73, it is to be understood, immediately on the withdrawal of the tooth 67' from the registered recesses will be forced out of alinement with the recess 72' on the companion plate, the counterweighted lever 76, which is shiftably supported by the transverse shaft 7, being utilized for this purpose. The plate 73 will move with the plate 72 until it meets the projection 77 on the vertically-disposed bar 78, attached, respectively, to the transverse plates 2' and 4', the further progress of said plate 73 being intercepted, although its mate continues to move to the left. When the bucket is lightened by the removal of a portion of its contents, the post 74 will be oppositely swung, the sliding plate being carried therewith until it meets the counterweighted lever 76, which holds it. These reciprocations of the parts will continue during the weighing operation and will decrease as the oscillations of the bucket become less and less and until the two notches register at a point opposite the tooth 67' of the latch-tripper 67, at which time said tooth will be thrust into such registered recesses.

For removing the tooth of the latch-tripper 67 from the registered recesses 72' and 73' on the discharge of the true load the following means may be employed, (see Figs. 2, 7, and 8:) A trigger is shown at 79 pivotally mounted on the vertical bar 78, the operating-arm of said trigger resting on a stud of said bar and being disposed under the latch-tripper 67, the free arm of the trigger being situated in the path of movement of a projection 80 on the reciprocatory rod 65, which is operative with the closer L, so that when said rod 65 is thrust downward in the manner previously described the projection 80 by engaging the free arm of the trigger will raise the operating-arm thereof and elevate the latch-tripper 67, so that the tooth of the latter may be withdrawn from the registered recesses 72' and 73', following which said latch-tripper will be returned to its normal position by the counterweighted lever 68.

The reciprocatory rod or bar 33, as hereinbefore stated, is furnished with an actuator for the load-reducing valve 29 and with a pair of actuators for the auxiliary load-supply valve 43, said last-mentioned actuators being alternately effective and one of them being in the form of a by-pass. At the commencement of operation the valve 29 will be shut, the valve 43, which is then coupled to its supporting-shaft 44, being held in its wide-open position by the fixed actuator 52, which is in engagement with the projection 51, connected to the valve 43.

When the bucket G is overloaded, it will immediately descend to a position below the poising-line, during which movement, as has been stated, a portion of the mass within the bucket will be removed therefrom and delivered to the load-supply device 42, subsequent to which, and on the rise of the lightened bucket, the valve 43 will be open, such operations alternating during the making of a load, the actuator 52, however, during this time being below the plane of the coöperating projection 51 of the valve 43.

When the weighed load has been discharged from the bucket, the valve 43 will be instantly uncoupled from its shaft, as has been described, and when the bucket has been fully discharged the closer will be shut, concurrently with which the valve 43 will be again coupled to its shaft, the actuator 52 during this interval being still below the projection 51, though the companion actuator 53 will have engaged, passed off, and risen above the projection 50 without disturbing the valve 43.

When the lightened bucket rises sufficiently far, the closer being shut, the actuator 52 will engage the projection 51 of the valve 43, which is then coupled to its shaft 44, so that the valve 43 will be immediately swung open to permit the mass from the auxiliary load-supply device to gravitate therefrom and into the empty bucket to form the nucleus of a new charge.

In these respects my present invention is in the nature of an improvement upon the machine described in my contemporaneously-pending application to which I have hereinbefore referred. In said application I have shown a reciprocatory rod or bar having a pair of alternately-effective actuators for the load-reducing and auxiliary load-supply valves, respectively, whereby material may be removed from and restored to the bucket during the weighing of a load by the action of said valve, and, in addition to this, an actuator on an independent member for operating the auxiliary load-supply valve after the weighed load has been discharged by the bucket and when the closer is shut, so that the contents of the auxiliary load-receiver may be conducted to the empty bucket; but in the present case and for the purpose of insuring the positive alternate action of the respective actuators the reciprocatory bar 33 will be provided with all three.

The operation of the hereinbefore-described weighing-machine is as follows: Fig. 3 represents the bucket empty, the closer L being shut and held in such position by the latch 18, the overload-controlling valve 21 being wide open, whereby the bucket G will be supplied with a stream of material, which will rapidly flow thereinto until it is overloaded, at which time said bucket will descend below the poising-line, as indicated in Fig. 4, the valve 21 in the interim having been closed by the counterweight 22. As the bucket passes below the poising-line the actuator 32 on the reciprocatory rod 33, which is controlled by the beam mechanism, will engage the projection 34 on the supporting rock-shaft 30 for the load-reducing valve, thereby opening said valve and permitting a portion of the material to flow from the load-reducing spout into the surplus-receiver or auxiliary load-supply device 42. When the bucket is underloaded, it will ascend, the actuator 32 moving away from the projection 34, and the valve 28 will be closed by the counterweighted arm 35, the stream from the spout 28 thereby being cut off. As the rod 33 moves upward the dog or actuator 53 will be moved into engagement with the projection 50, which, for the time being, is coupled to the auxiliary load-supply valve 43, so that the latter will be opened and a portion of material from the auxiliary load-supply spout will be delivered into the auxiliary load-receiver, and these operations will alternate until the bucket assumes a stationary position. While the bucket is oscillating up and down the two plates 72 and 73 will be reciprocated back and forth, said reciprocations becoming less as the oscillation of the bucket diminishes, so that when the bucket reaches a true poise the notches or recesses 72' and 73' will register at a point opposite the tooth 67' of the latch-tripper 67, and said tooth will be thrust into such registered recesses by the force of the counterweight of said latch-tripper. As said latch-tripper drops it will pull down on the connecting-rod 71, thereby throwing the three pivots of the toggle members 69 and 70 into alinement and forcing the latch 18 outward, so that the shoulder of the latter will be disengaged from the free arm of the angle-lever 19 and the closer L will be released and forced open by the weight of the contents in bucket G.

Having described my invention, I claim—

1. The combination with a load-receiver, of overloading means therefor; load-reducing and auxiliary load-supply means, each comprehending a valve; and a reciprocatory bar provided with an actuator for the load-reducing valve and having also a pair of actuators for said auxiliary load-supply valve.

2. The combination with a load-receiver, of overloading means therefor; load-reducing and auxiliary load-supply means, each comprehending a valve; and a reciprocatory bar provided with an actuator for the load-reducing valve and having also a pair of actuators for the auxiliary load-supply valve, one of which is a by-pass actuator.

3. The combination with a load-receiver and overloading means therefor, of a supporting scale-beam for said load-receiver; load-reducing and auxiliary load-supply means, each comprehending a valve; and a reciprocatory bar provided with an actuator for the load-reducing valve and having also a pair of actuators for said auxiliary load-supply valve, said bar being controlled by said scale-beam.

4. The combination with a load-receiver and beam mechanism therefor, of overloading means; load-reducing and auxiliary load-supply means, each comprehending a valve; and a pair of operatively-connected bars controlled by the beam mechanism, one of which has a pair of actuators, one for each of said valves.

5. The combination with framework, of a load-receiver and beam mechanism therefor; load-reducing and auxiliary load-supply means, each comprehending a valve; a rock-shaft mounted on the framework and having a pair of rock-arms attached thereto; and rods connected to said rock-arms, one of which is controlled by the beam mechanism, the other being furnished with a pair of actuators for the valves.

6. The combination with a bucket, of a series of supporting scale-beams therefor; a chute; a valve for said chute, provided with a depending rod; a scale-beam supported independently of said series of scale-beams and operatively connected to one of them; a shaft for sustaining said independently-supported scale-beam; and a valve-actuator oscillatory about said shaft and positioned for transmitting a thrust to said rod.

7. The combination with a bucket, of a series of supporting scale-beams therefor; a chute; a valve for said chute, provided with a depending rod; a scale-beam supported independently of said series of scale-beams and operatively connected to one of them and having a hub provided with a projection; a shaft passing through said hub; and a valve-actuator normally resting on said projection and oscillatory about said shaft and also positioned for transmitting a thrust to said rod.

8. The combination with a bucket, of a series of supporting scale-beams therefor, each consisting of two longitudinal sections joined at points adjacent to its ends; an independently-supported weight-beam operatively connected to one of said series of beams by a rod; a supply-hopper; a valve for said hopper; and actuating means for said valve.

9. The combination with a bucket having a closer, of a rod passing through said bucket and attached to said closer; a rocker mounted on the bucket and operatively connected to said rod, said rocker also constituting a stop; means for holding said rocker against movement; a chute having a valve; and a stop operative with the valve and coactive with said first-mentioned stop.

10. The combination with a bucket having a closer, of a rod attached to said closer and passing through the bucket; overloading and load-reducing means for causing the descent of the bucket below and above the poising-line; and means for holding said rod and thereby the closer against movement as the bucket passes below and above the poising-line.

11. The combination with a bucket having a closer, of means comprehending a latch for holding said closer against movement; a toggle attached to said latch; and a latch-tripper operatively connected to said toggle.

12. The combination with framework, of a bucket having a closer; means comprehending a latch for holding said closer against movement; a toggle attached to said latch and also to the framework; and a movably-mounted latch-tripper operatively connected to said toggle.

13. The combination with a bucket having a closer, of means comprehending a latch for holding said closer against movement; a toggle attached to said latch; and a rod operatively connected to said toggle and also to a tripper for said latch.

14. The combination with framework, of a bucket having a closer; means comprehending a latch for holding said closer against movement, said latch being supported by the framework; and a toggle attached to said latch and also to the framework and operatively connected to a tripper for said latch.

15. The combination with a bucket having a closer, of means comprehending a latch for holding the same against movement; a latch-tripper; a trigger for operating the latter; and a reciprocatory member having a device operative therewith for engaging said trigger.

16. The combination with a bucket having a closer, of means comprehending a latch for holding the same against movement; a latch-tripper; a trigger for operating the latter; and means operative with the closer for engaging said trigger.

17. The combination with a bucket having a closer, of means comprehending a latch for holding said closer against movement; a toggle attached to said latch; and a self-active latch-tripper operatively connected to said latch.

18. The combination with a bucket having a closer, of means comprehending a latch for holding said closer against movement; a toggle attached to said latch; a latch-tripper; a trigger for actuating said latch-tripper; and a reciprocatory member having a device operative therewith for engaging said trigger.

19. The combination with framework, of a bucket having a closer; means comprehending a latch for holding said closer against movement; a latch-tripper; a trigger mounted on the framework and adapted for operating said latch-tripper; and means operative with the closer for engaging said trigger.

20. The combination with a bucket and with load-reducing and auxiliary load-supply means, each comprehending a valve, the hub of the auxiliary load-supply valve being sleeved to a support and constituting one member of a clutch; of a complemental clutch member on said support; an operating-lever for the latter; and a rock-shaft having three rods pivoted to rock-arms thereon, said rods being operatively connected, respectively, with said load-reducing valve, said lever, and said closer.

21. The combination with a bucket having a closer normally held against movement by means comprehending a latch, of a latch-tripper; a trigger for the latter; load-reducing means comprehending a valve; and a rod operatively connected to said valve and the closer and provided with a projection for engaging said trigger.

22. The combination with a bucket having a closer, of means comprehending a latch for holding the same against movement; a toggle attached to said latch and having a latch-tripper operatively connected thereto, said latch-tripper having a tooth; a pair of reciprocatory plates; and means for reciprocating said plates, whereby the notches may be caused to register at a point opposite the tooth of the latch-tripper and into which said tooth may be thrust.

FRANCIS H. RICHARDS.

Witnesses:
FRED. J. DOLE,
GEO. A. HOFFMAN.